Jan. 29, 1963          H. L. McCOMBS, JR           3,075,351
           CONTROL FOR HYDRAULIC SERVO-ACTUATED APPARATUS
Filed April 8, 1960                              2 Sheets-Sheet 1

INVENTOR.
HOWARD L. McCOMBS, JR.
BY
Gordon H. Chenez
AGENT

Jan. 29, 1963  H. L. McCOMBS, JR  3,075,351
CONTROL FOR HYDRAULIC SERVO-ACTUATED APPARATUS
Filed April 8, 1960  2 Sheets-Sheet 2

INVENTOR.
HOWARD L. McCOMBS, JR.
BY
AGENT 3,075,351
Patented Jan. 29, 1963

3,075,351
CONTROL FOR HYDRAULIC SERVO-ACTUATED APPARATUS

Howard L. McCombs, Jr., South Bend, Ind., assignor to The Bendix Corporation, a corporation of Delaware
Filed Apr. 8, 1960, Ser. No. 20,907
9 Claims. (Cl. 60—39.28)

This invention relates in general to hydraulic control apparatus and in particular to a hydraulic servo system in which a hydraulic servo pressure differential is regulated in proportion to the magnitude of a pneumatic pressure input signal to the servo system.

The present invention is particularly adapted for use, although not limited to use therewith as will be apparent to those skilled in the servo control art, in the fuel control system of an aircraft gas turbine engine. One condition of engine operation used almost universally in gas turbine engine fuel control systems is compressor discharge air pressure. Since the compressor discharge air is normally at a relatively high temperature and contaminated with dust, dirt and other particles of matter sucked into the compressor air intake, the usual procedure is to utilize the compressor discharge air pressure in a static or non-flowing condition. Suitable means including a pressure actuated servo valve connected to modulate a servo fuel pressure is provided to sense the discharge air pressure and modulate the servo fuel pressure as a function of the discharge air pressure. The servo fuel pressure then may be utilized to position a fuel control valve which, in turn, controls the supply of fuel to the engine.

It is an object of this invention to provide improved means for modulating a hydraulic servo pressure as a function of a pneumatic pressure input signal in accordance with the relationship $$P_c \text{ absolute} = K(P_x - P_0)$$

or $$P_c \text{ absolute} = K(P_x - P_0)$$

where $P_c$ absolute = pneumatic pressure absolute
$P_x$ = servo hydraulic pressure
$P_0$ = drain hydraulic pressure against which servo hydraulic pressure is referenced
$K$ = a constant In the accompanying sheets of drawings.

Figure 1:
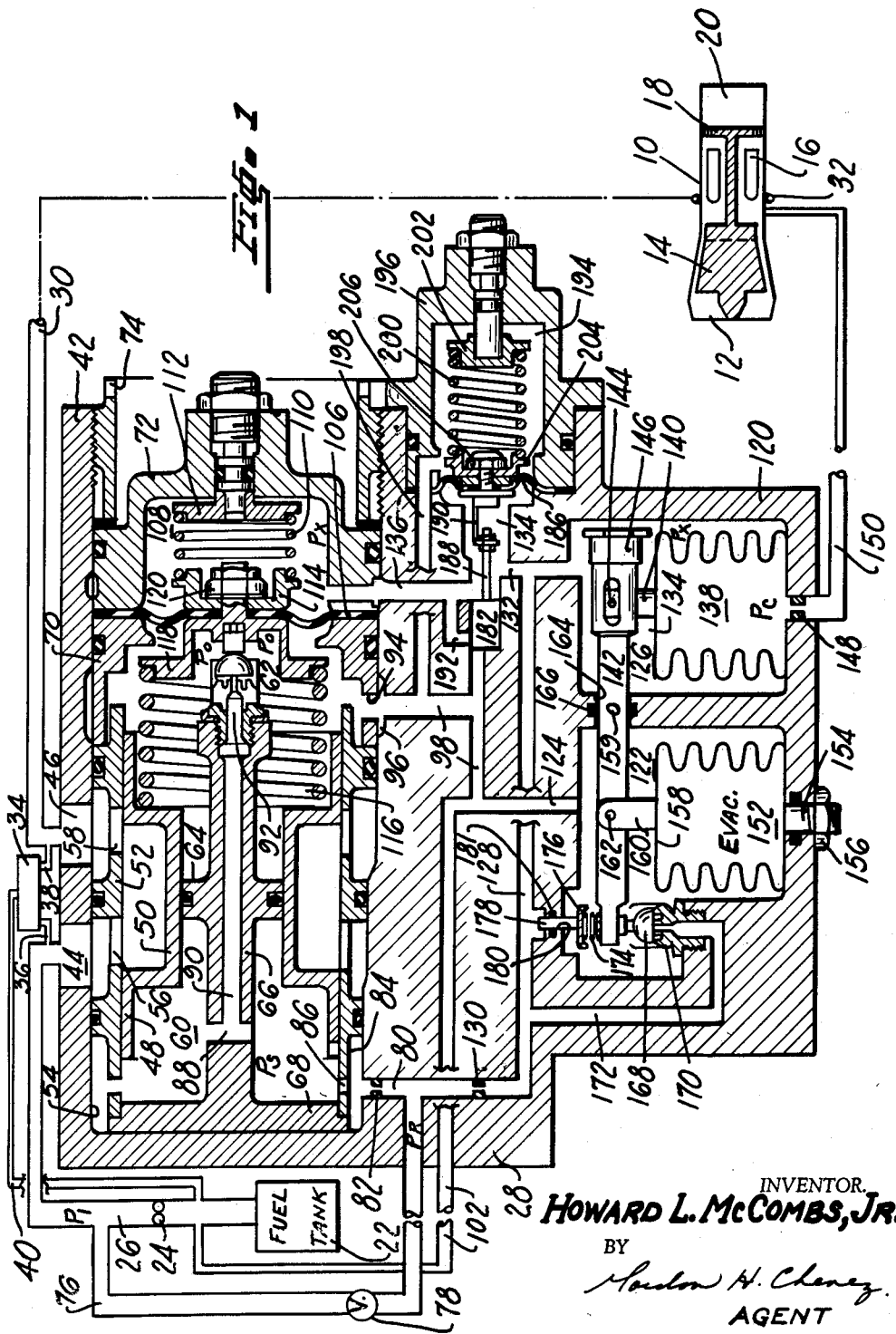
FIGURE 1 represents a section view of an aircraft gas turbine engine fuel control system embodying the present invention.

Referring to FIGURE 1, numeral 10 designates an aircraft gas turbine engine having an air intake 12, an air compressor 14, combustion chambers 16, a turbine 18 responsive to products of combustion from the chambers 16 and connected to drive the compressor 14, and an outlet 20 from which the products of combustion are expelled to the atmosphere to provide propelling thrust. Fuel is supplied to the combustion chambers from a source 22 via an engine driven fuel pump 24, a fuel conduit 26, a fuel control 28, a fuel conduit 30, a fuel manifold 32 and a plurality of fuel nozzles, not shown, which discharge fuel into combustion chambers 16. The fuel pressure drop across the fuel control 28 is maintained at a predetermined constant value by a conventional by-pass valve unit 34 having passages 36 and 38 connected to conduits 26 and 30, respectively, and a passage 40 through which excess fuel is delivered back to the inlet of pump 24.

The fuel control 28 is provided with a casing 42 having fuel inlet and outlet ports 44 and 46 which communicate with fuel conduits 26 and 30, respectively. A sleeve valve 48 having a reduced diameter midportion 50 is slidably carried by a fixed sleeve 52 contained in a bore 54 and provided with one or more inlet ports 56 and one or more outlet ports 58. The effective flow area and thus the quantity of fuel passed through the outlet ports 58 is regulated by the sleeve valve 48, the position of which relative to the outlet ports 58 depends upon the fuel pressure differential $P_s - P_0$ developed between chambers 60 and 62 which are partially defined by an annular wall 64 formed on a fixed tubular member 66, the tubular member 66 being concentric with sleeve valve 48. The tubular member 66 is provided with a flange 68 which is clamped between the casing 42 and one end of fixed sleeve 52, the latter being fixed in position by means of an annular spacing member 70, an end cap 72 and an annular lock member 74 threadedly engaged with casing 42.

The chamber 60 is supplied fuel from conduit 26 at pressure $P_1$, via a passage 76 containing a pressure regulating valve 78 which limits the fuel pressure downstream therefrom to a constant predetermined value $P_R$, a passage 80 containing a restriction 82 and an annular recess 84 and ports 86 formed in sleeve 52. The chamber 60 is vented to chamber 62 at drain pressure $P_0$ through radial and axial passage 88 and 90 found in the tubular member 66 and a flapper valve assembly 92 located at the discharge end of axial passage 90. The chamber 62 communicates with a suitable source of drain pressure which, in the present case, is fuel pump inlet pressure $P_0$ via a port 94 in spacing member 70, an annular recess 96, a passage 98, and a passage 102 leading to conduit 26 at drain or pump inlet pressure $P_0$.

The fuel pressure differential $P_s - P_0$ between chambers 60 and 62 is controlled by the flapper valve assembly 92 which regulates the effective flow area of the discharge passage 90 and thus the pressure $P_s$ in chamber 60. The position of the flapper valve of valve assembly 92 is controlled by a flexible diaphragm 106 which, at its outer edge, is clamped between spacing member 70 and end cap 72 and which is responsive to the control fuel pressure differential $P_x - P_0$ between chamber 62 at pressure $P_0$ and a chamber 108 at control pressure $P_x$. A spring 110 interposed between an adjustable spring retaining member 112 threadedly engaged with end cap 72 and a spring retaining member 114 fixedly secured to diaphragm 106 exerts a relatively small pre-load on the diaphragm 106 in a direction to close the valve assembly 92. A position feed back spring 116 interposed between the sleeve valve 48 and a spring retaining member 118 fixedly secured to the diaphragm 106 serves to load the diaphragm 106 in opposition to the force generated by the control fuel pressure differential $P_x - P_0$ acting thereacross and the force of spring 110. The spring retaining members 114 and 118 are fixedly secured to the diaphragm 106 by any suitable fastening means such as the nut 120 threadedly engaged with retaining member 118. Opposite end portions of sleeve valve 48 are provided with equal effective areas exposed to fuel pressures $P_s$ and $P_0$, respectively, such that the sleeve valve 48 is unbalanced axially toward an opening direction in response to an increasing pressure differential $P_s - P_0$. The sleeve valve 48 assumes a balanced position when the force of feedback spring 116 balances the force generated by the control fuel pressure differential $P_x - P_0$ plus the force of spring 110. Thus, for each value of the pressure differential $P_x - P_0$ there is established a corresponding position of sleeve valve 48, which position determines the quantity of fuel delivered through outlet ports 58 to the engine.

The fuel pressure $P_x$ and thus control fuel pressure differential $P_x - P_0$ is controlled as a function of compressor discharge pressure $P_c$ by a pressure converting unit 120 which includes a chamber 122 connected to passage 102 at drain fuel pressure $P_0$ via a passage 124 and a chamber 126 connected to passage 80 via a passage 128 containing a restriction 130. The passage 128 downstream from restriction 130 is also connected to chamber 108 via a passage 132, a chamber 134 and a passage 136. A bellows 138 disposed in chamber 126 is anchored at one end to casing 42 by any suitable means, not shown, providing an air tight connection and at its opposite movable end 134 carries a link 140 pivotally connected to one end of a lever 142 by adjustable pin 144. The pin 144 is arranged to be adjusted along the lever 142 by a suitable adjusting member 146 for purposes to be explained hereafter. The interior of the bellows 138 is vented to a suitable source of compressor discharge pressure $P_c$ via a restricted port 148 in casing 42 and a passage 150. An evacuated bellows 152 disposed in chamber 122 is adjustably anchored at one end to casing 42 by any suitable means such as the threaded extension 154 and nut 156 and carries on its opposite movable end 158 a link 160 pivotally connected to a pin 162 secured to lever 142. The lever 142 extends through an opening 164 in casing 42 between chambers 122 and 126 and is pivotally mounted on a pin 159 secured to casing 42. An annular resilient seal 166 suitably disposed in casing 42 adjacent the opening 164 serves as a fluid seal between adjacent cooperating surfaces of the casing 42 and lever 142. The free end of lever 142 is adapted to engage the flapper valve 168 of a valve assembly 170 located at the discharge end of a passage 172 connected between passage 80 downstream from restriction 82 and chamber 136 at fuel pressure $P_0$. The position of the flapper valve 168 as established by the forces applied to lever 142 by bellows 138 and 152 determines the effective flow area of the passage 172 and thus the fuel pressure $P_x$. To compensate for the force generated by the control fuel pressure differential $P_x - P_0$ acting across flapper valve 168 and tending to open the same there is provided a spring 174 which is interposed between the free end of the lever 142 and a spring retaining member 176 and which acts against lever 142 in opposition to the force tending to open the flapper valve 168. A pin 178 fixedly secured at one end to the spring retaining member 176 and slidably carried in an opening 180 in casing 42 between passage 80 and chamber 136 is responsive to the control pressure differential $P_x - P_0$ whereupon the spring 174 is compressed accordingly to balance the fuel pressure differential $P_x - P_0$ across flapper valve 168. An annular resilient seal 181 suitably disposed in casing 42 serves to seal adjacent cooperating surfaces of pin 178 and casing 42.

The control fuel pressure differential $P_x - P_0$ is limited to a predetermined maximum value in accordance with a maximum allowable compressor discharge pressure $P_c$. To this end, a piston 182 slidably carried in chamber 134 and connected to a diaphragm 186 via links 188 and 190 is arranged to control the effective flow area of passage 136 and a drain passage 192 connected between passage 136 and passage 98 at fuel pressure $P_0$. The diaphragm 186 is exposed on one side to the fuel pressure $P_x$ and on the opposite side to drain fuel pressure $P_0$ in a chamber 194 defined by an end cap 196 which end cap also serves to clamp the outer edge portion of diaphragm 186 against casing 42. The end cap 196 is fixedly secured to casing 34 by any suitable means, not shown. A passage 198 communicates chamber 194 with passage 98 at drain pressure $P_0$. The control fuel pressure differential $P_x - P_0$ acts against diaphragm 186 in opposition to a spring 200 interposed between an adjustable spring retainer 202 threadedly engaged with end cap 196 and a spring retaining member 204 fixedly secured to diaphragm 186 and link 190 by a nut 206 threadedly engaged with link 190. When the predetermined maximum pressure differential $P_x - P_0$ is obtained the diaphragm 186 is unbalanced against spring 200 causing piston 182 to move and simultaneously reduce the flow area of passage 136 and increase the flow area of passage 192. The subsequent reduction in control fuel pressure differential $P_x - P_0$ across diaphragm 106 effects closing movement of sleeve valve 48 and a reduction in fuel flow to the engine to thereby limit the compressor discharge pressure $P_c$ to the aforementioned predetermined maximum value. The force exerted by spring 200 against diaphragm 186 may be varied as desired by suitable adjustment of the spring retaining member 202, which force determines the fuel pressure differential $P_x - P_0$ required to unbalance diaphragm 186. It will be noted that, while the pressure $P_x$ in passage 136 downstream from piston 182 is reduced, the pressure $P_x$ upstream from the piston 182 is maintained at its initial value by virtue of the piston 182 which effects a reduction in flow area of passage 136. Thus, the predetermined maximum pressure differential $P_x - P_0$ generated by the pressure converting unit 120 in response to the maximum allowable compressor pressure $P_c$ is maintained across the diaphragm 186. Of course, subsequent variations in engine operation such as a request for a decrease in engine speed will effect a corresponding decrease in compressor discharge pressure $P_c$ in response to which the pressure converting unit 120 will reduce the control pressure differential $P_x - P_0$ accordingly which, in turn, allows spring 200 to bias diaphragm 186 and piston 182 to the left closing passage 192 and opening passage 136. The pressure $P_x$ and this pressure differential $P_x - P_0$ applied to diaphragm 106 then rises to the full value established by the pressure connecting unit 120 whereupon the sleeve valve 48 is controlled accordingly.

*Operation of FIGURE 1*

Assuming steady operation of the engine under a given set of engine operating conditions, the air compressor 14 will deliver air at a substantially constant pressure $P_c$ which pressure is applied to the pressure converting unit 120 which, in turn, regulates the control fuel pressure $P_x$ to establish a control fuel pressure differential $P_x - P_0$ that is proportional to the pressure $P_c$. The control fuel pressure $P_x - P_0$ acts across diaphragm 106 which controls the position of the flapper valve of valve assembly 92, the flapper valve, in turn, regulating the fuel pressure differential $P_s - P_0$ across sleeve valve 48 and thus the position of sleeve valve 48. The feedback spring 116 translates the position of the sleeve valve 48 into a force which opposes the force generated by the pressure differential $P_x - P_0$ acting across diaphragm plus the relatively preload exerted by spring 110. Stabilization of sleeve valve 48 occurs when a balance of forces exists across diaphragm 106.

For any given compressor discharge pressure $P_c$ applied to the pressure converting unit there is generated a control pressure differential $P_x-P_0$ which is proportional to the pressure $P_c$. To this end, the pressure converting unit operates in accordance with the folowing relationship wherein the pressures $P_x$, $P_s$, $P_c$ and $P_0$ are the heretofore defined pressures in the system, $A_1$ and $A_2$ represent the effective areas of the movable ends of bellows 152 and 138, respectively, and $L_1$ and $L_2$ represent the effective lever arms from pin 158 to pins 162 and 144, respectively.

(1)  $$(P_x-P_c)A_2L_2=(P_0-0)A_1L_1$$

multiplying through both sides of Equation 1 gives (2)  $$P_xA_2L_2-P_cA_2L_2=P_0A_1L_1-0$$

transporting terms of Equation 2 gives (3)  $$P_x-P_c \text{ absolute}=P_0\frac{A_1}{A_2}\frac{L_1}{L_2}$$

By suitable adjustment of the pin 144, the lever arms $L_2$ may be shortened or lengthened to produce a lever arm ratio $L_1/L_2$ which is the reciprocal of the bellows area ratio $A_1/A_2$ whereupon Equation 3 reduces to (4)  $$P_x-P_c \text{ absolute}=P_0$$

or (5)  $$P_c \text{ absolute}=P_x-P_0$$

From the foregoing, it is apparent that the pressure converting unit 120 functions to modulate the control fuel pressure differential $P_x-P_0$ in proportion to the compressor discharge pressure $P_c$.

Referring to FIGURE 1, it will be noted that the bellows arrangement of the pressure converting unit 120 possesses a fail safe advantage in the event that the bellows 138 ruptures or otherwise develops leakage across the wall thereof. Should such malfunction occur, the lever 142, from its position in FIGURE 1, would be rotated counterclockwise in response to the fuel pressure differential $P_0-0$ acting across bellows 152 causing flapper valve 168 to close which, in turn, allows the fuel pressure $P_x$ to increase to the regulated fuel pressure $P_r$. The action of the diaphragm 186 and piston 182 will limit the pressure differential $P_x-P_0$ to the maximum control fuel pressure differential $P_x-P_0$ in the manner heretofore described. Thus the fuel flow to the engine will be maintained sufficiently high to prevent any loss in engine power in the event of failure of the bellows 138.

If the bellows 152 should experience a rupture or the like, the loss of the pressure differential $P_0-0$ thereacross would not effect a complete loss of fuel pressure $P_x$ but instead would result in a reduction in the same since the pressure differential $P_x-P_0$ across bellows 138 would still be effective in loading the lever 142.

Figure 2:
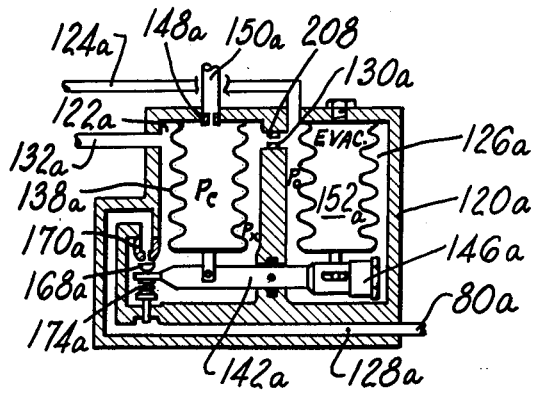
FIGURE 2 is a section view of a modified form of the pneumatic to hydraulic pressure converter of FIGURE 1.

Referring to FIGURE 2 which illustrates the pressure converter 120 of FIGURE 1 in modified form similar elements are designated by the same numerals used in FIGURE 1 with the addition of the subscript a. In this arrangement, the evacuated bellows 152 is disposed in chamber 126a which is vented to drain fuel pressure $P_0$ and bellows 138a is disposed in chambers 122a which is vented to chamber 152a via a passage 208 in casing 42 which passage 208 contains the restriction 130a. The principal difference between the pressure converters 120 of FIGURES 1 and 2 is that in FIGURE 1 the servo valve assembly 170 is downstream from the restriction 130 whereas in FIGURE 2, the servo valve assembly 170a is upstream from the restriction 130a. The arrangement of FIGURE 2 permits control of the fuel pressure $P_x$ to a relatively low value since closing movement of the flapper valve 168a will ultimately result in a decrease of fuel pressure $P_x$ to the drain fuel pressure $P_0$. Of course, the upper limit of the fuel pressure $P_x$ will be decreased accordingly since chamber 122a is continuously vented to drain pressure via the restriction 130a which, with the flapper valve 168a wide open, causes a reduction in this available pressure $P_x$ by virtue of the flow through the restriction 130a. In some systems in which the present invention may be used it may be desirable to operate over a range of relatively low values of the control fuel pressure differential $P_x-P_0$ in which case the arrangement of FIGURE 2 can be used effectively. It will be noted that, with the restriction 130 upstream from the servo valve assembly 170 as shown in FIGURE 1, the pressure $P_x$ may attain a relatively high value in comparison to that attained in FIGURE 2 but the lowest attainable pressure $P_x$ is correspondingly higher than that obtained in FIGURE 2.

Figure 3:
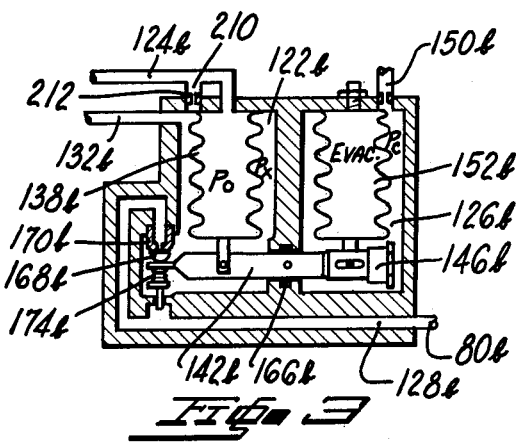
FIGURE 3 is a section view of a second modified form of the pneumatic to hydraulic pressure converter of FIGURE 1.

Referring to FIGURE 3, which illustrates a second modified form of the pressure converter 120, elements similar to those shown in FIGURE 1 are designated by like numerals with the addition of the subscript b. In this arrangement the evacuated bellows 152b is disposed in chamber 126b where it is subjected exteriorly to compressor discharge pressure $P_c$. The bellows 138b is disposed in chamber 122b at fuel pressure $P_x$ and its interior is vented to drain fuel pressure $P_0$ via passage 124b. A passage 210 containing a restriction 212 communicates chamber 122b with passage 124b. It will be noted that the bellows 138b is responsive to the fuel pressure differential $P_x-P_0$ and acts against lever 142b in opposition to compressor discharge pressure $P_c$ absolute. Unlike FIGURES 1 and 2, the bellows 138b does not provide a seal between the fuel pressure $P_x$ and the air pressure $P_c$ since the fuel pressures $P_x$ and $P_0$ are confined to chamber 122b and the air pressure $P_c$ is confined to chamber 126b. Chambers 122b and 126b are sealed against communication by the O ring 166b interposed between casing 120b and the lever 142b.

The arrangement shown in FIGURE 3 provides an important feature not found in the arrangements shown in FIGURES 1 and 2 in that the lever adjusting means 146b can be adjusted to make the control pressure differential $P_x-P_0$ any desired percentage of the compressor discharge pressure $P_c$ absolute in addition to establishing a lever arm ratio which is the reciprocal of the bellows area as heretofore described. This added feature is possible by virtue of the pressure differential $P_c-0$ across bellows 152b acting through lever arm $L_2$ against the pressure differential $P_x-P_0$ across bellows 138b acting through lever arm $L_1$. It is readily seen that by increasing or decreasing the lever arm $L_2$, a correspondingly larger or smaller, respectively, control fuel pressure differential $P_x-P_0$ will be required to effect an equal and opposite torque. Thus, the aforementioned equation $P_c$ absolute $= P_x-P_0$ is modified accordingly by the addition of a constant $K$ and $P_c$ absolute $= K(P_x-P_0)$, wherein the constant $K$ depends upon the setting of the lever adjusting means 146b.

Figure 4:
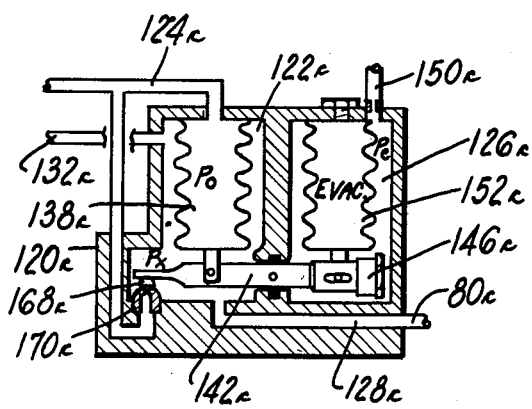
FIGURE 4 is a section view of a third modified form of the pneumatic to hydraulic pressure converter of FIGURE 1.

Referring to FIGURE 4 which illustrates a third modified form of the pressure converter 120 elements similar to those shown in FIGURE 1 are designated by the numerals with the addition of the subscript c. The arrangement of FIGURE 4 is identical to that shown in FIGURE 3 with the exception of the direction of fuel flow through the servo valve 170c. It will be noted that in FIGURE 4 the servo fuel supply passage 128c is connected to chamber 122c and chamber 122c is vented to drain fuel pressure $P_0$ via servo valve 170c such that the fuel pressure $P_x$ is developed upstream from servo valve 170c rather than downstream from the same as is the case in FIGURES 1, 2 and 3. This arrangement establishes the same pressure differential $P_x-P_0$ across both servo valve 170c and bellows 138c. The pressure differential across servo valve 170c acts against an effective area equal to the effective flow area of the flapper valve 168c and the resulting force acts through a lever arm $L_3$ from the flapper valve 168c to pin 158c to thereby load the lever 142c in the same direction as the pressure differential $P_x - P_0$ in opposition to the torque generated by the bellows 152c acting through its lever arm $L_1$. This arrangement, unlike that of FIGURES 1, 2 and 3, does not require the balance pin 178 to compensate for pressure unbalance across servo valve 170c. To this end, the pressure converting unit 120c operates in accordance with the following relationship wherein the pressures $P_x$, $P_s$, $P_c$ and $P_0$ are the heretofore defined pressures in the system, $P_r$ is regulated servo fuel pressure, $A_1$ and $A_3$ are the effective areas of bellows 152c and 138c, respectively. As is the effective flow area of flapper valve 168c, $L_1$ and $L_2$ are the effective lever arms from pin 153 to pins 162 and 144, respectively, and $L_3$ is the effective lever arm from pin 153 to the center of the flapper valve 168b.

(1) $\quad (P_c - 0) A_2 L_2 = (P_x - P_0)(A_1 L_1 - A_3 - L_3)$ which reduces to (2) $\quad P_c \text{ absolute} = (P_x - P_0)\dfrac{(A_1 L_1 - A_3 - L_3)}{A_2 L_2}$ Since the areas $A_1$ and $A_3$ as well as the lever arms $L_1$ and $L_3$ are constant, the quantity $P_x - P_0$ can be made any percentage of $P_c$ absolute as desired through the simple expedient of adjusting the lever arm $L_2$ to provide the required $A_1 L_1 - A_3 L_3$ to $A_2 L_2$ ratio.

It will be apparent to those persons skilled in the art to which the above described invention relates that various modifications and changes in the form and relative arrangement of parts may be made to suit requirements without departing from the spirit of the invention. It is obvious that ordinary engineering skill and technique may be utilized to provide access means for removing and replacing parts within the casing or for making adjustments and the like to the mechanisms. Conventional fluid seals may be used where required to seal one fluid pressure from another.

I claim:

1. In a fuel control system for a combustion engine having an output air pressure which varies with engine power output, the combination of a fuel conduit connected to supply fuel to said engine, valve means in said fuel condit for controlling fuel flow therethrough, means responsive to a fuel servo pressure differential operatively connected to said valve means for controlling the operation thereof, and means for controlling said fuel servo pressure differential as a function of said output air pressure including first and second fuel conduits for communicating separate fuel pressures to said pressure differential responsive means, a valve member operatively connected to said first fuel conduit for controlling the fuel pressure therein, first and second chambers, a first pressure responsive member separating said first and second chambers, a passage communicating said first chamber with said first fuel conduit at said controlled fuel pressure, a passage communicating said second chamber with said output air pressure, a second pressure responsive member having a fluid connection with said second fuel conduit and being responsive to the fuel pressure therein, and a lever pivotally mounted on a fixed support and operatively connected at one end to said first pressure responsive member and connected at the opposite end to said valve member, said second pressure responsive member being connected to said lever intermediate said first pressure responsive member and said valve member, said first and second pressure responsive members being operative to load said lever in the same direction to produce a resultant torque, said valve member being actuated by said lever and operative to control the fuel pressure in said first fuel conduit and thus in said first chamber accordingly, said first pressure responsive member being responsive to the fuel pressure in said first chamber and operative to load said lever to produce an equal and opposite torque which balances said resultant torque, a vent passage communicating said first fuel conduit at said controlled fuel pressure with said second fuel conduit, a normally closed valve member operatively connected to said vent passage for controlling fuel flow therethrough, and means responsive to said fuel servo pressure differential operatively connected to said normally closed valve member for actuating the same to an open position in response to a predetermined maximum allowable value of said fuel servo pressure differential.

2. In a fuel control system as claimed in claim 1 wherein said second pressure responsive member is an evacuated bellows having a fixed end and a movable end, said movable end being pivotally connected to said lever.

3. In a fuel control system as claimed in claim 1 wherein said operative connection between said lever and said first pressure responsive means includes adjustable means for varying the effective lever arm between the pivot point of said lever and said first pressure responsive means to establish a predetermined ratio between said lever arm and the lever arm between said pivot point of said lever and said second pressure responsive means.

4. In a fuel control system for a combustion engine having an air compressor, the combination of a fuel conduit connected to supply fuel to said engine, valve means in said fuel conduit for controlling fuel flow therethrough, means responsive to a fuel servo pressure differential operatively connected to said valve means for controlling discharge air pressure including first and second fuel servo pressure differential as a function of compressor discharged air pressure including first and second fuel conduits for communicating separate fuel pressures to said pressure differential responsive means, a valve member operatively connected to said first fuel conduit for controlling the fuel pressure therein, first and second chambers, a first pressure responsive member separating said first and second chambers, a passage communicating said first chamber with said first fuel conduit at said controlled fuel pressure, a passage communicating said second chamber with said output air pressure, a second pressure responsive member having a fluid connection with said second fuel conduit and being responsive to the fuel pressure therein, and a lever pivotally mounted on a fixed support and operatively connected at one end to said first pressure responsive member and connected at the opposite end to said valve member, said second pressure responsive member being connected to said lever intermediate said first pressure responsive member and said valve member to thereby load said lever in the same direction as the output air pressure acting against said first pressure responsive means so as to produce a resultant torque, said valve member being actuated by said lever and operative to control the fuel pressure in said first fuel conduit and thus said first chamber accordingly, said resultant torque being balanced by an equal and opposite torque derived from said first pressure responsive means acting through said lever in response to the fuel pressure in said first chamber, a vent passage communicating said first fuel conduit with said second fuel conduit, a normally closed valve member operatively connected to said vent passage for controlling fuel flow therethrough, and means responsive to the fuel pressure differential between said first and second fuel conduits operatively connected to said normally closed valve member for actuating the same to an open position in response to a predetermined maximum allowable value of said fuel pressure differential.

5. Control apparatus for regulating a control hydraulic pressure differential derived from separate sources of relatively high and relatively low hydraulic pressures as a function of a variable pneumatic pressure, comprising a conduit connecting said sources of relatively high and low hydraulic pressures, a valve member operatively connected to said conduit for controlling flow therethrough, first pressure responsive means connected to a source of said pneumatic pressure, second pressure responsive means connected to said source of relatively low hydraulic pressure, a conduit communicating said source of relatively high hydraulic pressure with one of said first and second pressure responsive means, a lever member mounted to pivot about a fixed support and operatively connected to said valve member for actuating the same, said first and second pressure responsive means being operatively connected to said lever member on opposite sides of said fixed support and aranged to load said lever in opposition to each other, said lever being unbalanced by an increase in said pneumatic pressure whereupon the position of said valve member and thus said relatively high hydraulic pressure is regulated in accordance with the degree of pivotal movement of said lever member, said lever being stabilized in response to the relatively low hydraulic pressure acting upon said second pressure responsive means and the relatively high hydraulic pressure acting upon one of said first and second pressure responsive means in opposition to the other of said first and second pressure responsive means and means for limiting the control hydraulic pressure differential to a predetermined maximum allowable value including a vent passage communicating said last named conduit with said source of relatively low hydraulic pressure, a normally closed valve member operatively connected to said vent passage for controlling fuel flow therethrough, and pressure responsive means responsive to the control hydraulic pressure differential operatively connected to said normally closed valve for actuating the same to an open position in response to said predetermined maximum allowable value of said control hydraulic pressure differential.

6. Control apparatus for regulating a control hydraulic pressure differential as claimed in claim 5 wherein said second named conduit communicates said source of relatively high hydraulic pressure with said second pressure responsive means, and said second pressure responsive means is responsive to the differential between said relatively high and low hydraulic pressures.

7. Control apparatus for regulating a control hydraulic pressure differential derived from separate sources of relatively high and relatively low hydraulic pressures as a function of a variable pneumatic pressure, comprising a first chamber communicating with said source of relatively low hydraulic pressure, a second chamber, a first passage communicating said second chamber with a source of substantially constant relatively high hydraulic pressure, a valve member operatively connected to said first passage for controlling flow therethrough to thereby regulate the relatively high hydraulic pressure in said second chamber, a restricted passage communicating said first chamber with said chamber, a first evacuated bellows disposed in said first chamber and responsive to the relatively low hydraulic pressure therein, a second bellows disposed in said second chamber and vented interiorly to a source of variable pneumatic pressure, a lever pivotally mounted on a fixed support member and extending from said support member in opposite directions into said first and second chambers, respectively, into pivotal engagement with said first evacuated bellows and said second bellows, and means for limiting said control hydraulic pressure differential to a predetermined maximum allowable value including a vent passage communicating said second chamber with said source of relatively low hydraulic pressure, a normally closed valve operatively connected to said vent passage for controlling fuel flow therethrough, and pressure responsive means responsive to a predetermined differential between the regulated hydraulic pressure in said second chamber and the relatively low hydraulic pressure operatively connected to said normally closed valve for actuating the same to an open position, said lever being operatively connected to said valve member to actuate the same and being loaded in a valve opening direction by the combined forces of said pneumatic pressure acting against said second bellows and said relatively low hydraulic pressure acting against said first exacuated bellows and being urged in a valve closing direction by the force of said relatively high hydraulic pressure acting against said first evacuated bellows, said relatively high hydraulic pressure in said second chamber being regulated by said valve member to a value proportional to said pneumatic pressure whereupon said lever is stabilized.

8. Control apparatus for regulating a control hydraulic pressure differential derived from separate sources of relatively high and relatively low pressures as a function of a variable pneumatic pressure, comprising means defining first and second chambers, a lever mounted for pivotal movement on a fixed support and extending therefrom in opposite directions into said first and second chambers, a restricted passage communicating said first chamber with a source of variable pneumatic pressure, a first exacuated bellows disposed in said first chamber and responsive to the pneumatic pressure therein, a second bellows disposed in said second chamber, a first passage communicating the interior of said second bellows with a source of relatively low hydraulic pressure, a second passage communicating said second chamber with a source of substantially constant relatively high hydraulic pressure, a third restricted pasage communicating said second chamber with said first passage, a valve member operatively connected to said second passage for controlling flow therefrom into said second chamber, a vent passage communicating said second chamber with said source of relatively low hydraulic pressure, a normally closed valve operatively connected to said vent passage for controlling fuel flow therethrough, and movable wall means responsive to a predetermined differential between the hydraulic pressure in said second chamber and the relatively low hydraulic pressure operatively connected to said normally closed valve for actuating the same to an open position in response to said predetermined differential, said valve member being operatively connected to one end of said lever and actuated thereby, said lever being operatively connected to said first evacuated bellows and said second bellows and loaded in a valve opening direction by the pneumatic pressure acting against said first bellows in opposition to the control hydraulic pressure differential acting across said second bellows, said lever and thus said valve member being stabilized by said control hydraulic pressure differential which is proportional to said pneumatic pressure.

9. Control apparatus for regulating a control hydraulic pressure differential derived from separate sources of relatively high and relatively low hydraulic pressures and controlled as a function of a variable pneumatic pressure, comprising a source of substantially constant relatively high hydraulic pressure, a source of relatively low hydraulic pressure, a conduit communicating said sources of relatively high and low hydraulic pressures, valve means operatively connected to said conduit for controlling flow therethrough, a fixed restriction in said conduit in series flow relationship with said valve means, pressure differential responsive means having fluid connections with said conduit intermediate said valve means and said restriction and with said source of relatively low hydraulic pressure and being responsive to the control hydraulic pressure differential therebetween, pressure responsive means having a fluid connection with and being responsive to said variable pneumatic pressure, lever means operatively connected to said pressure differential responsive means, said pressure responsive means and said valve means for actuating said valve means, said lever means being pivotally mounted on a fixed support and loaded in one direction by said pressure responsive means and in the opposite direction by said pressure differential responsive means such that the position of said valve means and thus the hydraulic pressure to which said pressure differential responsive means is subjected is regulated in proportion to the torque derived from said pressure responsive means acting through said lever means, said torque being balanced by an equal opposite torque derived from said pressure differential responsive means acting through said lever means, a vent passage communicating said source of relatively low hydraulic pressure with said conduit intermediate said valve means and said restriction, a normally closed valve operatively connected to said vent passage for controlling fuel flow therethrough, and pressure responsive means responsive to a predetermined pressure differential between said relatively low hydraulic pressure and the control hydraulic pressure intermediate said valve means and said restriction, said pressure responsive means being operatively connected to said normally closed valve for actuating the same to an open position in response to said predetermined pressure differential.

References Cited in the file of this patent

UNITED STATES PATENTS

| | | |
|---|---|---|
| 2,675,818 | Gallo et al. | Apr. 20, 1954 |
| 2,851,048 | Hutchinson | Sept. 9, 1958 |
| 2,934,898 | Graefe et al. | May 3, 1960 |
| 2,941,358 | Kuzmitz | June 21, 1960 |

UNITED STATES PATENT OFFICE
CERTIFICATE OF CORRECTION

Patent No. 3,075,351 January 29, 1963

Howard L. McCombs, Jr.

It is hereby certified that error appears in the above numbered patent requiring correction and that the said Letters Patent should read as corrected below.

Column 1, line 37, the equation should appear as shown below instead of as in the patent:

$$P_c \text{ absolute} = P_x - P_o$$

column 7, line 45, for "condit" read -- conduit --; column 8, line 29, strike out "discharge air pressure including first and second" and insert instead -- the operation thereof, and means for controlling said --; line 31, for "discharged" read -- discharge --; column 10, lines 1 and 16, for "exacuated", each occurrence, read -- evacuated --.

Signed and sealed this 8th day of October 1963.

(SEAL)
Attest:

ERNEST W. SWIDER

Attesting Officer

EDWIN L. REYNOLDS

Acting Commissioner of Patents